US009072085B2

(12) United States Patent
Lei et al.

(10) Patent No.: US 9,072,085 B2
(45) Date of Patent: Jun. 30, 2015

(54) METHOD FOR ENHANCING SACCH PERFORMANCE

(75) Inventors: Haipeng Lei, Beijing (CN); Xiaoqiang Li, Beijing (CN)

(73) Assignee: Samsung Electronics Co., Ltd. (KR)

( * ) Notice: Subject to any disclaimer, the term of this patent is extended or adjusted under 35 U.S.C. 154(b) by 176 days.

(21) Appl. No.: 13/392,649

(22) PCT Filed: Aug. 25, 2010

(86) PCT No.: PCT/KR2010/005696
§ 371 (c)(1),
(2), (4) Date: Feb. 27, 2012

(87) PCT Pub. No.: WO2011/025257
PCT Pub. Date: Mar. 3, 2011

(65) Prior Publication Data
US 2012/0155356 A1    Jun. 21, 2012

(30) Foreign Application Priority Data

Aug. 25, 2009   (CN) .......................... 2009 1 0167446

(51) Int. Cl.
*H04W 72/04* (2009.01)
*H04W 76/04* (2009.01)
(52) U.S. Cl.
CPC ...... *H04W 72/0406* (2013.01); *H04W 72/0446* (2013.01); *H04W 76/048* (2013.01)
(58) Field of Classification Search
CPC .................... H04W 72/0493; H04W 72/0446; H04W 72/048; H04W 72/04; H04W 72/044
See application file for complete search history.

(56) References Cited

U.S. PATENT DOCUMENTS

| 6,772,112 B1 | 8/2004 | Ejzak |
| 2004/0062274 A1 | 4/2004 | Hakansson et al. |

(Continued)

OTHER PUBLICATIONS

PCT/ISA/237 Written Opinion issued on PCT/KR2010/005696 (pp. 4).

(Continued)

*Primary Examiner* — Chirag Shah
*Assistant Examiner* — Rina Pancholi
(74) *Attorney, Agent, or Firm* — The Farrell Law Firm, P.C.

(57) ABSTRACT

A method for enhancing Slow Associated Control CHannel (SACCH)) erformance, which includes steps of: if a user that uses a half-rate Traffic CHannel(TCH) is contained in a coupled user group, a base station instructing the user on an Adaptive Multi-user channels on One Slot VAMOS sub-channel to use a half-rate sub-channel 0 and a half-rate sub-channel 1 alternately; if a current 26-multiframe is an even frame in an SACCH cycle, the user on the VAMOS sub-channel delivering a TCH frame and an SACCH frame over the originally allocated half-rate sub-channel; if the current 26-multiframe is an odd frame in an SACCH cycle, the user on the VAMOS sending the TCH frame and the SACCH frame after exchanging his/her own half-rate sub-channels; and a reception side performing demodulation and deciphering after receiving its own information. This invention also includes another method for enhancing SACCH performance, which can significantly improve the error tolerance of the SACCH using the method of retransmitting the SACCH when the TCH is in the DTX state and does not need to send any information. According to the present invention, the code error rate of the SACCH can be decreased and the SACCH performance can be enhanced, thus realizing the object of improving the system capacity.

43 Claims, 12 Drawing Sheets

(56) References Cited

U.S. PATENT DOCUMENTS

| | | |
|---|---|---|
| 2004/0170148 A1 | 9/2004 | Parkkinen et al. |
| 2006/0221880 A1* | 10/2006 | Riddington et al. .......... 370/310 |
| 2009/0201880 A1 | 8/2009 | Aghili et al. |
| 2010/0067440 A1* | 3/2010 | Dick et al. .................... 370/328 |
| 2011/0205947 A1* | 8/2011 | Xin et al. ...................... 370/311 |
| 2012/0182913 A1* | 7/2012 | Kreuzer ........................ 370/311 |
| 2013/0028202 A1* | 1/2013 | Hofmann ...................... 370/329 |

OTHER PUBLICATIONS

PCT/ISA/210 Search Report issued on PCT/KR2010/005696 (pp. 3).

\* cited by examiner

Fig. 5

| VAMOS Sub-Channel 1 | T | T | T | T | T | T | T | T | T | T | T | A | T | T | T | T | T | T | T | T | T | T | T | T | T | - |
|---|---|---|---|---|---|---|---|---|---|---|---|---|---|---|---|---|---|---|---|---|---|---|---|---|---|---|
| VAMOS Sub-Channel 2 | t | t | t | t | t | t | t | t | t | t | t | A | t | t | t | t | t | t | t | t | t | t | t | t | t | a |

[a]

| VAMOS Sub-Channel 1 | T | T | T | T | T | T | T | T | T | T | T | A | T | T | T | T | T | T | T | T | T | T | T | T | T | - |
|---|---|---|---|---|---|---|---|---|---|---|---|---|---|---|---|---|---|---|---|---|---|---|---|---|---|---|
| VAMOS Sub-Channel 2 | t | t | t | t | t | t | t | t | t | t | t | a | t | t | t | t | t | t | t | t | t | t | t | t | t | A |

VAMOS Sub-Channel 1: T T T T T T T T T T A T T T T T T T T
VAMOS Sub-Channel 2: t t t t t t t t t A t t t t t t t t t a (b)

VAMOS Sub-Channel 1: T T T T T T T T T T A T T T T T T T T
VAMOS Sub-Channel 2: t t t t t t t t t a t t t t t t t t t A

| | T | t | t | t | T | t | t | T | T | T | T | t | A | t | T | T | T | T | T | T | t | t | a |
|---|---|---|---|---|---|---|---|---|---|---|---|---|---|---|---|---|---|---|---|---|---|---|---|
| VAMOS Sub-Channel 1 | T | t | t | t | T | t | t | T | T | T | T | t | A | t | T | T | T | T | T | T | t | t | a |
| VAMOS Sub-Channel 2 | T | t | t | t | T | t | t | T | T | T | T | t | A | t | T | T | T | T | T | T | t | t | a |

Fig. 10

[a] tttttttttAtttttttta

[b] tttttttAAttttttta

[c] TTTTTTATTTTTTTaa

Fig. 11

| T | t | T | t | t | T | T | T | T | T | A | T | T | T | T | T | T | T | T | T | t | a |
| T | T | T | T | T | T | T | T | T | T | A | T | T | T | T | T | T | T | T | T | T | – |

VAMOS Sub-Channel 1
VAMOS Sub-Channel 2

Fig. 12

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

Downlink FACCH/H Sub-Channel 0

| F/F | | | | | F/F | | | | F | | | F/F | | | F/F | | | F | | | F/F | | | F/F | |

Downlink FACCH/H Sub-Channel 1

| | | F/F | | | | | F/F | | | F | | | F/F | | | F | | | F/F | | | F/F | | | F/F |

(a)

(b)

Uplink FACCH/H Sub-Channel 0

| | | | | F | | | F/F | | | F/F | | | F | | | F/F | | | F/F | | | F | | | F/F |

Uplink FACCH/H Sub-Channel 1

| F/F | | | F | | | F | | | F | | | F/F | | | F | | | F/F | | | F | | | F | |

(c)

(d)

METHOD FOR ENHANCING SACCH PERFORMANCE

PRIORITY

This application claims priority to International Patent Appl. No. PCT/KR2010/005696 filed Aug. 25, 2010, and to Chinese Patent Application No. 200910167446.2 filed Aug. 25, 2009, each of which is incorporated herein by reference.

TECHNICAL FIELD

The present invention relates to a wireless communication system, and particularly to a method for enhancing Slow Associated Control CHannel(SACCH) performance, so as to improve reliability of a user's voice service in the wireless communication system.

BACKGROUND ART

In recent years, due to sharply increased requirements for the mobile voice service, Global System for Mobile Communication(GSM) networks have been developed considerably. However, it is increasingly difficult for limited frequency resources to meet people's communication requirements, particularly in population-intensive urban areas. Along with an increase in an aging degree of GSM network devices, there is an urgent need to perform capacity expansion for the existing GSM networks. On the other hand, due to increasingly decreased expense for the voice service, an operator needs to effectively reuse existing hardware resources and frequency resources. Therefore, how to improve system capacity without increasing the existing system frequency resources has become a very important research project.

Multiple User Reusing One Slot(MUROS) techniques are mainly applied in 3rd Generation Partnership Project(3GPP) GSM/EDGE Radio Access Networks(GERAN), discussion for the Study Item stage, which seeks to improve user capacity of a GSM system and help the operator to eliminate a network burden, is started from the GERAN #36 conference in November 2007. The Work Item stage begins from the GERAN #40 conference in November 2008, and is formally named Voice services over Adaptive Multi-user channels on One Slot(VAMOS).

A VAMOS system needs to further improve voice capacity while reusing the existing network devices and wireless resources. In feasibility research phase, a candidate VAMOS solution primarily refers to multiplexing two or more users in the same slot without decreasing communication quality. At present, it is mainly considered to double the voice capacity of the system, i.e. two users reuse one slot. On one hand, this causes an influence on full-rate and half-rate voice channels (TCH/FS, TCH/HS, TCH/EFS, TCH/AFS and TCH/WFS), as well as corresponding associated control channels such as the Slow Associated Control CHannel(SACCH) and the Fast Associated Control CHannel(FACCH). On the other hand, after the VAMOS techniques are used, co-channel interference and adjacent channel interference increasingly occur as the number of the users in a cell increase, which results in a Carrier Interference Ratio(C/I) and frequency multiplexing decrease. There in a need to further investigate how to achieve a compromise between the frequency multiplexing decrease and the slot reusing improvement.

The existing VAMOS candidate solutions are mainly composed of three types as follows.

1) A Co-Traffic CHannel(Co-TCH) Scheme

Downlink: Gaussian Minimum Shift Keying(GMSK) baseband modulated signals in two channels (a difference between phases of the two channels is $\pi/2$) are linearly combined, and are transmitted after being radio modulated and power amplified.

Uplink: Each mobile station employs the GMSK modulation respectively and uses different Train Sequence Codes (TSC), and the multiplexed user signals in the two channels are separated out using a method such as joint detection at a base station side.

2) An Orthogonal Sub-Channel(OSC) Scheme

Downlink: The user signals in the two channels are transmitted using Quadrature Phase Shift Keying(QPSK), and the signal of every channel may be received by GMSK modulation at the user reception side.

Uplink: Each mobile station employs the GMSK modulation respectively and uses different Train Sequence Codes, and the multiplexed signals in the two channels are separated out using a method such as interference cancelation at a base station side.

3) An Adaptive Symbol Constellation mapping(ASC) Scheme

Downlink: With the alpha-QPSK scheme, transmission powers of an In-phase(I) channel and a Quadrature(Q) channel may be controlled by adaptively adjusting the constellation mapping.

Uplink: Each mobile station employs the GMSK modulation respectively and uses different Train Sequence Codes, and the multiplexed signals in the two channels are demodulated by a Multi-User Multiple-Input and Multiple-Output (MU-MIMO) receiver at a base station side.

At present, it is mainly considered to adopt the above 3 types of schemes in the VAMOS Work Item stage, which results in that two users may share the same time-frequency resource, so as to achieve the object of improving the system capacity by 2 multiples. However, which scheme is specifically used for the 3GPP GERAN is still in discussion.

Any of the schemes may be regarded as sharing two sub-channels of the same time-frequency resource, i.e. sub-channel 1 and sub-channel 2. Generally, sub-channel 1 is compatible with legacy mobile terminals and only VAMOS mobile phones can use sub-channel 2.

FIG. 1 is a structural diagram illustrating a frame of a GSM system. The GSM system employs Time Division Multiple Address(TDMA), where each TDMA frame is divided into 8 slots numbered as 0, 1, . . . , 7. The slot is a basic wireless resource unit for the GSM system, and each slot is a basic physical channel. A message format in a slot over the TDMA channel is called a Burst, i.e. each Burst is sent in a slot contained in the TDMA frame. According to a certain slot allocation principle, every mobile station is made to send a signal to the base station only in specified slots within each frame, and locations of such slots in the TDMA frame are fixed from one frame to another frame. In the case that timing and synchronization conditions are satisfied, the base station may receive the signal from each mobile station in each slot without interference thereamong. Also, the signals sent from the base station to multiple mobile stations are arranged sequentially and are transmitted in predetermined slots. Each mobile station can differentiate the signal sent to it from the combined signals if performs reception in the specified slot.

FIG. 2 is a structural diagram illustrating a multi-frame of the GSM system. In the GSM system, a TDMA frame has a frame length of 4.615 ms and contains 8 basic slots, thus each slot contains 156.25 symbols which occupy 15/26=0.577 ms. Multiple TDMA frames constitute the multi-frame, which has two structures composed of 26 or 51 TDMA frames respectively. When different logic channels are multiplexed into a physical channel, it is required to use such multi-frames. The multi-frame containing 26 TDMA frames are referred to as 26-multiframe, which has a time length of 120 ms and is used in the TCH and the associated control channel thereof, specifically as shown in FIG. 2. The TCH service channel may be divided into two types of full rate and half rate(the full-rate TCH and the half-rate TCH are usually represented as TCH/F and TCH/H), and the full-rate service channel has a transmission rate 2 times of that of the corresponding half-rate service channel. Using half of the available slots for the full-rate channel may obtain the half-rate channel. In terms of a quantity of the occupied burst, time for a full-rate channel may be used to transmit two half-rate channels, where these two half-rate channels are time division multiplexed. Thus, a carrier frequency may provide 8 full-rate or 16 half-rate service channels. In FIG. 2, the structural diagram illustrating the full-rate channel and the half-rate channel is provided. Specifically, A, a are corresponding SACCHs, I is an idle frame, and T, t are corresponding TCHs. As can be seen, for the full-rate TCH, the $0^{th}$~$24^{th}$ frames are occupied within a 26-multiframe and the $25^{th}$ frame is the idle frame. For the half-rate TCH, a 26-multiframe may transmit two half-rate TCHs, which are called a half-rate sub-channel 0 and a half-rate sub-channel 1 in the GSM standard. Specifically, the half-rate sub-channel 0 occupies 12 frames i.e. the $0^{th}$, $2^{nd}$, $4^{th}$, $6^{th}$, $8^{th}$, $10^{th}$, $13^{th}$, $15^{th}$, $17^{th}$, $19^{th}$, $21^{st}$, $23^{rd}$ frames to send a voice block of the TCH/H channel, and sends an SACCH block over the 12th frame. The half-rate sub-channel 1 occupies 12 frames i.e. the $1^{st}$, $3^{rd}$, $5^{th}$, $7^{th}$, $9^{th}$, $11^{th}$, $14^{th}$, $16^{th}$, $18^{th}$, $20^{th}$, $22^{nd}$, $24^{th}$ frames to send the voice block of the TCH/H channel, and sends the SACCH block over the $25^{th}$ frame.

FIG. 3 is a schematic diagram illustrating downlink and uplink modulation for a VAMOS user group. In the downlink, bits from the TCH and the corresponding associated control channel of each user in the VAMOS user group are mapped onto an Adaptive Quadrature Phase Shift Keying(AQPSK) modulation symbol. At a reception side, the user demodulates the bit belonging to his/her TCH and corresponding associated control channel, and meanwhile performs wireless link measurement.

In FIG. 3, two coupled users employ the GMSK modulation and perform sending over the same time-frequency resource at the uplink in the same cell, i.e. the two users have the same slot number, Absolute Radio Frequency Channel Number(ARFCN) and TDMA frame number. Differentiation between the users depends on the Train Sequence Code(TSC) in data sent from the users. In the same cell, the user over the sub-channel 1 uses the Train Sequence Code in the TSC set 1, and the user over the sub-channel 2 uses the Train Sequence Code in the TSC set 2. At the reception side of the base station, the received signal for the two users is demodulated and/or deciphered using multi-user detection or interference cancellation techniques, and also a corresponding wireless link control process is perform for the two users.

In the VAMOS system, a typical user configuration scenario lies in that two full-rate TCH service channels are multiplexed over the same slot and frequency. As shown in FIG. 2, the voice service of the GSM system also includes a half-rate service, where a full-rate service occupies slots equal in quantity to those occupied by two half-rate services. Therefore, after the VAMOS multiplexing is adopted, the system allows two full-rate TCH users or four half-rate TCH users in maximum being multiplexed over the same physical resource, i.e. sharing the same slot number, frame number and ARFCN in the uplink and the downlink. The full-rate TCH user namely refers to the user using the full-rate TCH, and the half-rate TCH user namely refers to the user using the half-rate TCH. This is always the case hereinafter if no exception is clearly indicated in the context.

Therefore, a scenario occurs where "three users" are multiplexed together with each other: a full-rate TCH user+two half-rate TCH users, or alternatively, three half-rate TCH users (including: 1 half-rate TCH user+2 half-rate TCH users; 2 half-rate TCH users+1 half-rate TCH user, where the left side to the plus symbol refers to the TCH type over the VAMOS sub-channel 1 and the right side to the plus symbol refers to the TCH type over the VAMOS sub-channel 2). When any user in the user group has switched to an adjacent cell or terminates communication, the user group enters a "two-user" multiplexing situation, the specific scenarios of which include: a full-rate TCH user+a half-rate TCH user, a half-rate TCH user+a half-rate TCH user.

FIG. 4 is a structural diagram illustrating channels such as a TCH, a FACCH and an SACCH after VAMOS multiplexing is adopted (only one slot is considered in each frame). It should be noted that, the FACCH employs "stealing frame", i.e. delivery is performed by occupying the TCH when the FACCH is required.

In FIG. 4(a), two full-rate traffic users are multiplexed together with each other to constitute a VAMOS group, and share the same frame number, slot number and ARFCN.

In FIG. 4(b), a full-rate traffic user and two half-rate traffic users are multiplexed together with each other to constitute a VAMOS group. The full-rate traffic user occupies a VAMOS sub-channel, and the two half-rate traffic users are time division multiplexed over another VAMOS sub-channel.

In FIGS. 4(c) and 4(d), three half-rate traffic users are multiplexed together with each other. Two half-rate traffic users are time division multiplexed over a VAMOS sub-channel, and the remaining half-rate service occupies another VAMOS sub-channel.

In FIG. 4(e), four half-rate traffic users are multiplexed together with each other. Specifically, two half-rate traffic users are multiplexed over a VAMOS sub-channel, and the remaining two half-rate traffic users are multiplexed over another VAMOS sub-channel.

As can be seen from FIG. 4, the VAMOS achieves the object of expanding the system capacity by multiple users multiplexing the same time-frequency resource, but also causes interference between the coupled users, which results in a decrease in system performance. Although the orthogonality between the multiplexed two users are ensured at the sending side, the existing three VAMOS candidate schemes (Co-TCH, OSC and alpha-QPSK) may lead to signal leakage between the two sub-channels at the reception side due to inter-symbol interference resulted from multi-path propagation characteristics of the wireless channel as well as non-linear characteristics of a sending filter and a reception filter. In the downlink, this means that the multiplexed two users have interference on each other. While in the uplink, orthogonal characteristics cannot be ensured due to a random phase difference between the users, even if no time dispersion fading occurs in the channel. Since the orthogonality between the two sub-channels cannot be ensured at the reception side, the multiplexed two sub-channels have interference on each other, which leads to occurrence of an intra-cell interference. In this case, in both the full-rate TCH and the half-rate TCH, the interference between each other results in occurrence of serious code errors in the SACCH frame since the SACCH frames of the coupled users are always sent simultaneously, which results in a significant decrease in the system performance.

In the GSM system, the SACCH is a very important channel. Messages for the GSM system are sent in two logic channels, i.e. the BCCH and the SACCH. In idle mode, the system sends the system messages 1~4, 7 and 8 via the BCCH channel. In active mode, it delivers the system messages 5, 5*bis*, 5*ter* and 6 via the SACCH. Additionally, the downlink SACCH is also used to deliver the Layer-1 header messages, which include: communication quality, an LAI number, a cell ID, a BCCH frequency point signal intensity of the adjacent cell, a limit for the NCC, cell selection, a Timing Advance (TA) value and a power control level. The uplink SACCH bears a cell measurement report and a Layer-1 header message, which include: a signal intensity regarding the serving cell and the adjacent cell that is received by the mobile station, which is necessary for the mobile station to participate in switching, the TA value and the power control level. In addition, an MAC-layer massage is also delivered in the SACCH.

The SACCH contains 184 information bits in total, which are coded as 456 bits. An interleaving depth is 4. 456 bits are divided into 4 sub-blocks after being interleaved, and are mapped into 4 bursts. As shown in FIG. 2, for both the half-rate TCH and the full-rate TCH, the SACCH sub-block occurs in the 26-multiframe for only once. Therefore, a piece of complete SACCH information is composed of the SACCH sub-block in 4 continuous 26-multiframes. 4 26-multiframes are namely 104 TDMA frames, and therefore a period for the SACCH is 480 ms. In order to facilitate description, the 4 continuous SACCH sub-blocks are numbered as 0, 1, 2, and 3, and the 4 continuous 26-multiframes are called the SACCH frames which numbered as 0, 1, 2, and 3.

In view of importance of the SACCH and the fact that SACCH performance decreases in the VAMOS system due to the interference between the paired users, there is an urgent need to propose a new solution for enhancing the SACCH performance.

There is an existing SACCH enhancing method called "shifted SACCH", which is used in the situation that four half-rate TCHs are multiplexed together with each other. The core idea of such method is to change the position of the SACCH frame of the two half-rate TCHs on the VAMOS sub-channel 2, so as to be separated in time from the SACCH frame of the two half-rate TCHs on the VAMOS sub-channel 2, thus avoiding two SACCH frames occurring simultaneously. Thus, the SACCH frame of each user respectively occurs simultaneously with the TCH frame of the coupled user over another VAMOS sub-channel, and when one of the users is in a DTX state and does not need to send any information, the interference on the SACCH frame of his/her paired user may be decreased, thus achieving the object of enhancing the SACCH performance. However, the SACCH frame separated in time may have an influence on the interleaving process for the voice frame, which leads to time sequence confusion. On the other hand, considering that the FACCH channel employs the "stealing frame" manner and only occurs along with the TCH, it is possible that the shifted SACCH may occur simultaneously with the SACCH sent over another VAMOS sub-channel.

DISCLOSURE OF INVENTION

Technical Problem

Since the FACCH transmits very important signaling messages during user communication, the position of the shifted SACCH should be designed without confliction with the FACCH/H. However, the available shifted SACCH scheme has not taken the influence caused by the FACCH into consideration.

Another SACCH enhancing method is to postpone the 26-multiframe of one of the two paired users by certain frames, so as to achieve the object of separating the SACCH frame. Similarly, such SACCH enhancing method also has not taken the influence on the FACCH into consideration.

After the VAMOS multiplexing is introduced, in FIGS. 4(*b*), (*c*) and (*d*), the SACCH frame of some users is not subjected to the interference from the corresponding paired user, but the SACCH frame of some users are always in confliction with the SACCH of the paired user. In terms of the system, the SACCH performance for the user is imbalanced.

Solution to Problem

The object of the present invention is to provide a method for enhancing SACCH performance, so as to decrease the code error rate of the SACCH and improving the system capacity.

According to an aspect of the present invention, a method for enhancing Slow Associated Control CHannel(SACCH) performance includes steps of:

a) if a user that uses a half-rate Traffic CHannel(TCH) is contained in a paired user group, a base station instructing the user on an VAMOS sub-channel to use a half-rate sub-channel 0 and a half-rate sub-channel 1 alternately;

b) if a current 26-multiframe is an even frame in an SACCH period, the user on the VAMOS sub-channel delivering a TCH frame and an SACCH frame over the originally allocated half-rate sub-channel;

c) if the current 26-multiframe is an odd frame in an SACCH cycle, the user on the VAMOS sending the TCH frame and the SACCH frame after swapping his/her own half-rate sub-channels; and d) a reception side performing demodulation and deciphering after receiving its own information.

According to another aspect of the present invention, a method for enhancing Slow Associated Control CHannel (SACCH) performance includes steps ofs:

a) when a Traffic CHannel(TCH) is in a Discontinuous Transmission(DTX) mode, an SACCH frame being retransmitted over a frame that does not need to send a Silence Insertion Descriptor(SID); and b) a reception side demodulating the received SACCH frame and performing combination, so as to obtain a diversity gain.

According to still another aspect of the present invention, a method for enhancing Slow Associated Control CHannel (SACCH) performance includes steps of:

a) changing a location of an SACCH frame on an VAMOS sub-channel within each 26-multiframe, so as to avoid simultaneous occurrence with the SACCH frame on another VAMOS sub-channel; and b) a reception side demodulating its own SACCH frame at the given location, and performing demodulation and deciphering.

With the method according to the present invention, the code error rate of the SACCH can be decreased and the SACCH performance can be enhanced, thus realizing the object of improving the system capacity.

Advantageous Effects of Invention

The basic idea of the exemplary method lies in the following. The location of the SACCH frame on a VAMOS sub-channel is changed to avoid simultaneous occurrence with the SACCH frame on another VAMOS sub-channel. Thus, the gain may be obtained when the TCH is in the DTX state. Also, when the location of the SACCH frame is changed, the FACCH/H should be taken into consideration, so as to reduce the influence on the FACCH/H channel as much as possible.

BRIEF DESCRIPTION OF DRAWINGS

FIG. 5 is a schematic diagram illustrating a method for enhancing SACCH performance when 1 full-rate TCH and two half-rate TCHs are multiplexed together with each other according to a first embodiment of the present invention;

FIG. 6 is a schematic diagram illustrating the method for enhancing SACCH performance when 1 half-rate TCH and two half-rate TCHs are multiplexed together with each other according to the first embodiment of the present invention;

FIG. 7 is a schematic diagram illustrating the method for enhancing SACCH performance when 2 half-rate TCH and one half-rate TCHs are multiplexed together with each other according to the first embodiment of the present invention;

FIG. 8 is a schematic diagram illustrating the method for enhancing SACCH performance when four half-rate TCHs are multiplexed together with each other according to the first embodiment of the present invention;

FIG. 10 is a schematic diagram illustrating the method for enhancing SACCH performance when the half-rate TCH sub-channel 0 and sub-channel 1 are respectively in the DTX state according to the second embodiment of the present invention;

FIG. 11 is a structural schematic diagram illustrating the frame when 2 half-rate TCH and one half-rate TCHs are multiplexed together with each other according to a third embodiment of the present invention; and FIG. 12 is a structural schematic diagram illustrating the frame of a half-rate FACCH according to the third embodiment of the present invention.

MODE FOR THE INVENTION

Figure 1:
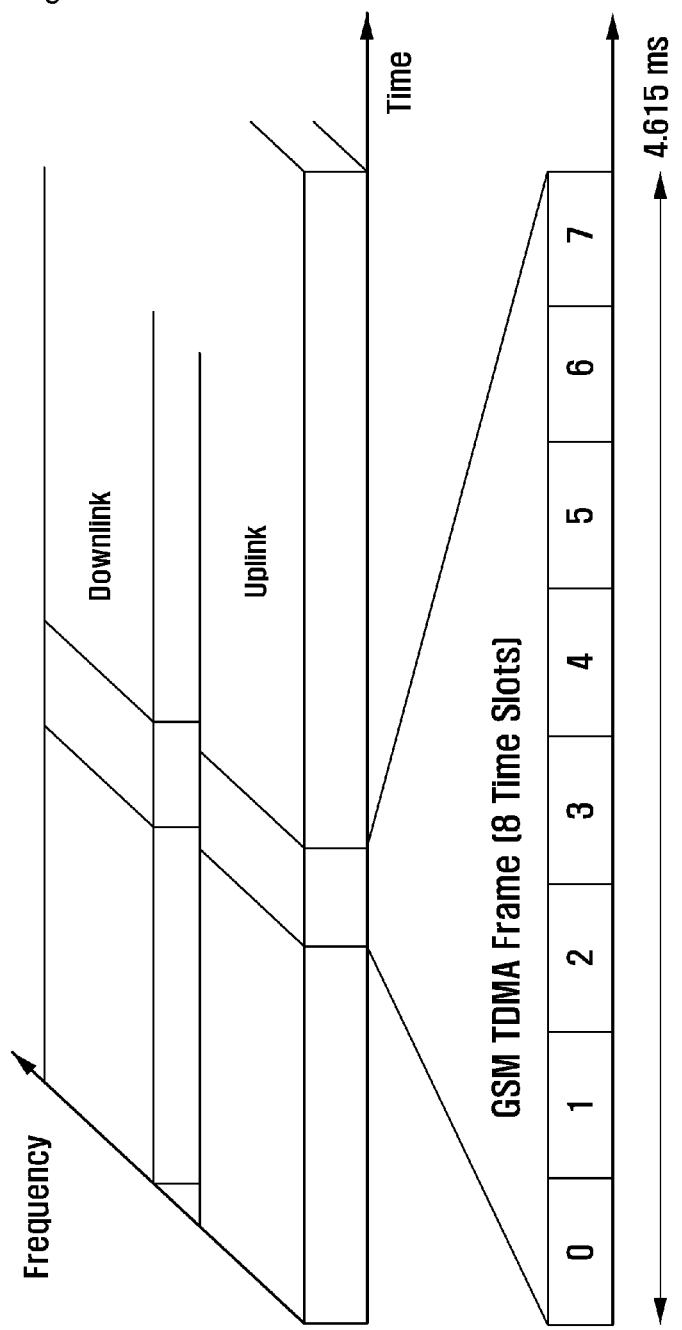
FIG. 1 is a structural diagram illustrating a frame of a GSM system.
Figure 2:
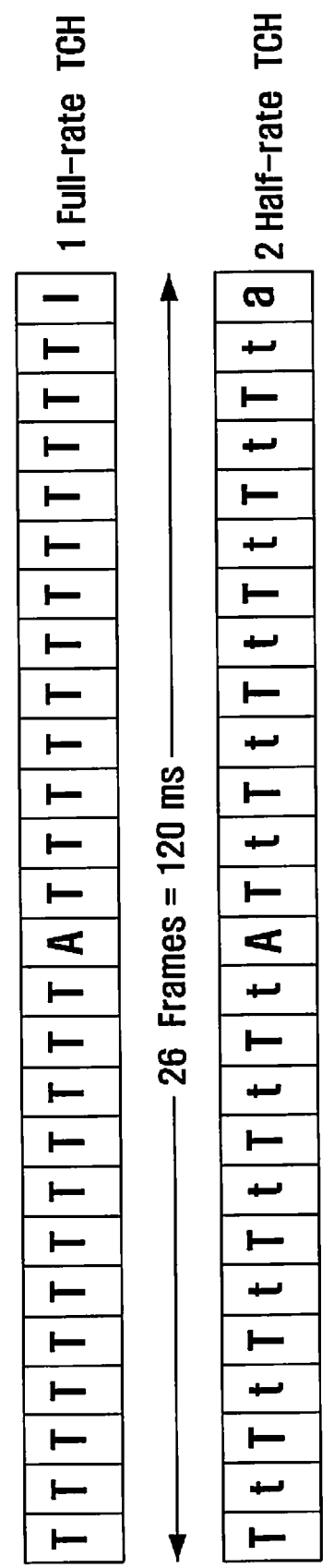
FIG. 2 is a structural diagram illustrating a multi-frame of the GSM system.
Figure 3:
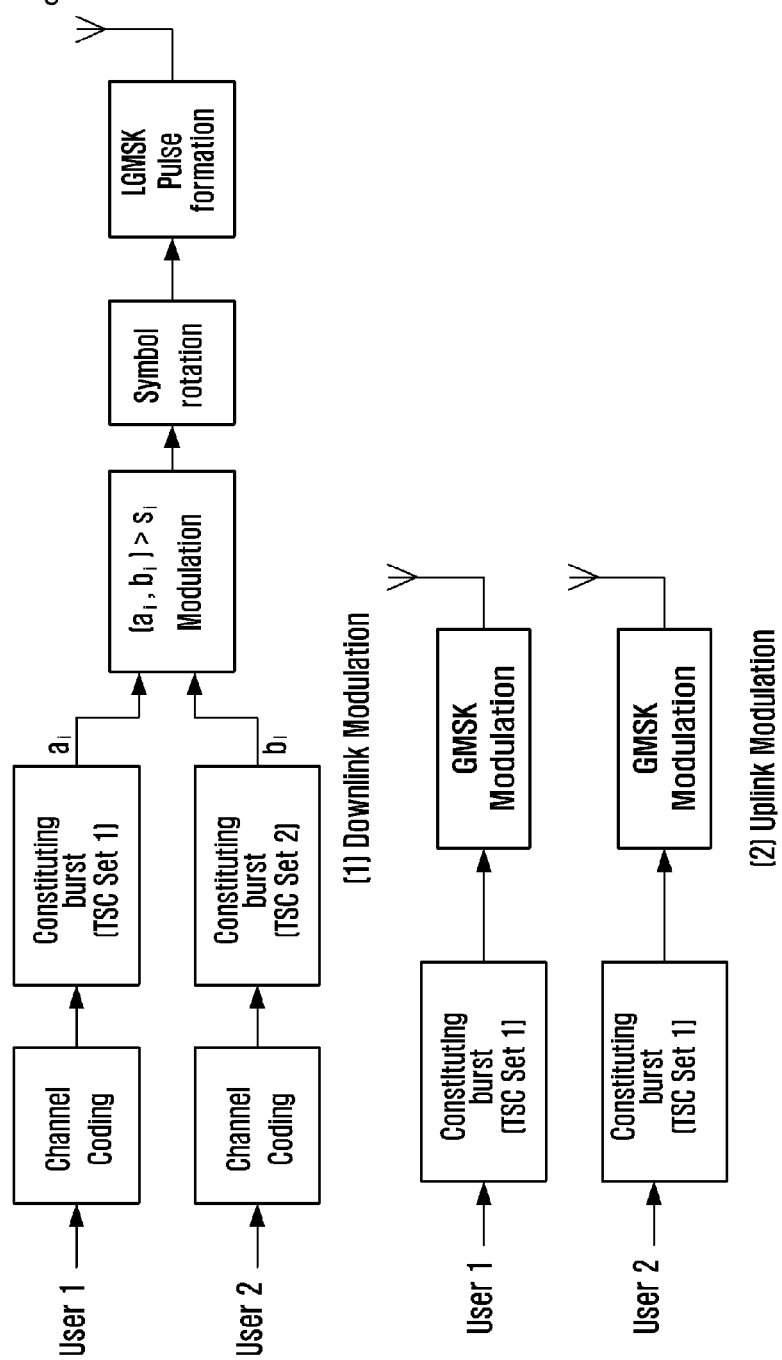
FIG. 3 is a schematic diagram illustrating downlink and uplink modulation for coupled users in a GERAN/VAMOS system.
Figure 4:
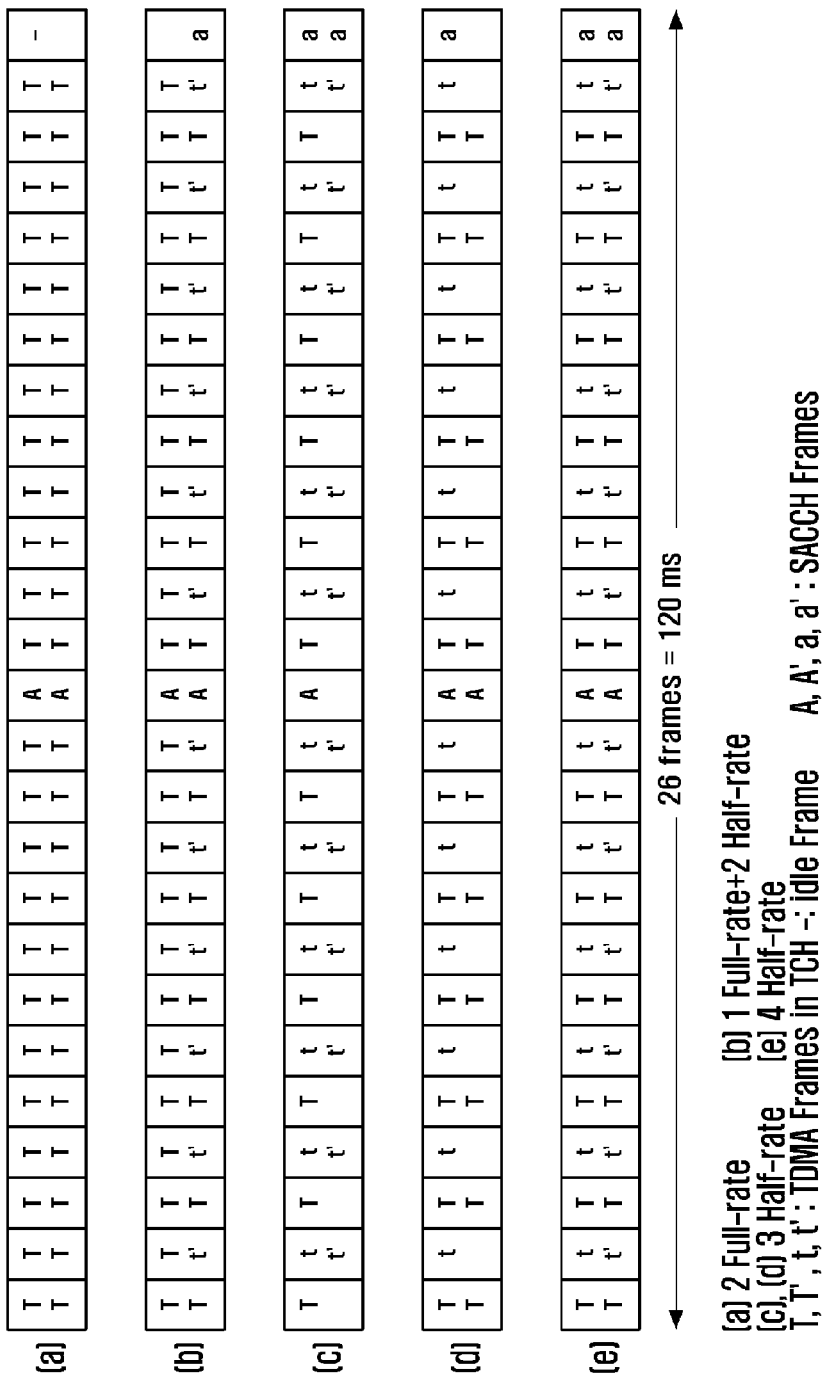
FIG. 4 is a structural diagram illustrating possible channels such as a TCH and an SACCH after VAMOS multiplexing is adopted.

To make the objects, technical solutions and advantages of the present invention more apparent, the present invention is described in further detail hereinafter with reference to the embodiments and the accompanying drawings.

The core idea of the present invention is as follows. By way of alterntely swapping the half-rate sub-channel 0 and the half-rate sub-channel 1 on the VAMOS sub-channel 2, the SACCH of the paired "three users" will not always be subjected to the interference from the SACCH of the same user at each frame, thus enhancing the SACCH performance. Also, according to another aspect of the present invention, the proposed method of retransmitting the SACCH when the user is in the DTX mode and does not need to send any information can significantly improve error tolerance of the SACCH.

Hence, the present invention enhances the SACCH performance and realizing the object of improving the system capacity.

The present invention provides three methods for enhancing SACCH performance.

The first method which alternately swaps the two half-rate sub-channels may be used in the GERAN/VAMOS system, and includes steps as follows:

a) When the coupled user group of the VAMOS system includes the user which uses the half-rate TCH, the user on the VAMOS sub-channel 2 alternately uses the half-rate sub-channel 0 and the half-rate sub-channel 1 within each 26-multiframe; and b) After receiving its own information, the reception side performs demodulation and deciphering.

The second method which retransmits the SACCH frame in the free period of the DTX mode may be used in the GERAN/VAMOS system, and includes steps as follows:

a) When being in the DTX mode, the sending side retransmits the SACCH frame over certain particular frames within each 26-multiframe that do not need to send a Silence Insertion Descriptor(SID); and b) The reception side demodulates the received SACCH frame, and performs combination to obtain a diversity gain.

The third method which changes the position of the SACCH frame may be used in the GERAN/VAMOS system, and includes steps as follows:

a) The position of the SACCH frame on one VAMOS sub-channel is changed to avoid simultaneous occurrence with the SACCH frame on another VAMOS sub-channel;

b) When the TCH/H on a VAMOS sub-channel is in the DTX state and does not need to send any information, the SACCH frame correspondingly located on another VAMOS sub-channel may be sent using the GMSK modulation and is not subjected to the interference from the paired user; and c) The reception side demodulates the SACCH frame belonging to itself at a given location, and performs demodulation and deciphering.

Whether the method for enhancing SACCH performance according to the present invention is executed is selectable. In the VAMOS system, trail coupling may be implemented through the channel handover mode within the cell, and the spare bit may be used as an indicator as to whether to execute the enhanced SACCH.

Embodiments

In this part, the embodiments of the present invention are given. In order to simplify the description to this patent, detailed description for well-known functions or devices are omitted in the following explanation.

First Embodiment

The method which alternately uses the half-rate sub-channels may be used in the GERAN/VAMOS system.

The present invention mainly seeks to the following. When the coupling situation of the user is multiplexing for 1 full-rate+2 half-rates, 1 half-rate+2 half-rates, 2 half-rates+1 half-rate, or 1 half-rate+1 half-rate or the like, interchanging the user's half-rate sub-channel on the VAMOS sub-channel 2 within each 26-multiframe may obtain relatively balanced SACCH performance, thus enhancing the SACCH performance of the whole system.

This embodiment may be sub-divided into four aspects.

1. Assume that a user 1 is the full-rate TCH user, and users 2 and 3 are two half-rate TCH users. The three users are multiplexed together with each other, where the user 1 occupies the VAMOS sub-channel 1 and the users 2 and 3 occupy the VAMOS sub-channel 2 (specifically, the user 2 occupies the half-rate sub-channel 0, and the user 3 occupies the half-rate sub-channel 1). Specific contents are as shown in FIG. 5.

A complete SACCH frame has a time length of 480 ms, i.e. the time length of 4 continuous 26-multiframes. 184 information bits are contained, which become 456 bits after being channel coded. The interleaving depth is 4. 4 continuous 26-multiframes are used for sending out the same. Assume that the 4 continuous 26-multiframes are numbered as 0, 1, 2, and 3 respectively. The SACCH of the user 1 is sent over the 12th frame, and the users 2 and 3 correspond to sending over the $12^{th}$ frame and the $25^{th}$ frame. Therefore, the SACCH frame of the user 2 is always subjected to the interference from the user 1, while the SACCH frame of the user 3 corresponds to the idle frame of the user 1. Hence, without modification, the SACCH frame of the user 3 is not subjected to the interference from the cell and has performance better than that of the user 2.

In order to balance the performance of the SACCH frame in the system, the two half-rate channels on the VAMOS sub-channel 2 are alternately used. If the current 26-multiframe is an even frame (i.e. the $0^{th}$ frame and the $2^{nd}$ frame) in an SACCH cycle, the original channel allocation condition is remained, i.e. the user 2 occupies the half-rate sub-channel 0 and the user 3 occupies the half-rate sub-channel 1, specifically as shown in FIG. 5($a$). If the current 26-multiframe is an odd frame (i.e. the $1^{st}$ frame and the $3^{rd}$ frame) in an SACCH cycle, the two sub-channels are interchanged with each other, i.e. the user 2 occupies the half-rate sub-channel 1 and the user 3 occupies the half-rate sub-channel 0, specifically as shown in FIG. 5($b$). Thus, the SACCHs of the user 2 and the user 3 alternately occur simultaneously with the idle frame of the user 1, which may obtain relatively balanced SACCH performance.

As shown in FIG. 5($a$), when any user in the user group has switched to an adjacent cell or terminates communication, the user group enters a "two-user" multiplexing situation. If it is the full-rate TCH user that leaves, the remaining two half-rate TCH users use different half-rate sub-channels. At this time, the system is not a VAMOS system. Since the two half-rate TCH users have no interference on each other, both the TCH and the SACCH performance are significantly enhanced. If it is the half-rate TCH user that leaves, two events may arise. If it is the user on the half-rate sub-channel 0 that leaves, i.e. the user 2 in this embodiment leaves, the remaining full-rate TCH user 1 sends the SACCH over the $12^{th}$ frame of each 26-multiframe, while the half-rate user 3 sends the SACCH over the $25^{th}$ frame of each 26-multiframe. Thus, the SACCH frames of them have no interference on each other, and the SACCH frame of either user occurs simultaneously with the idle frame of the other user. Therefore, the SACCH is not subjected to the interference from the coupled user, thus enhancing the SACCH performance. If it is the user on the half-rate sub-channel 1 that leaves, i.e. the user 3 in this embodiment leaves, since the remaining users 1 and 2 both sends the SACCH over the 12th frame of each 26-multiframe, there is still interference between their SACCH frames.

In this event, one of the following solutions may be adopted.

1) By intra-cell switching, the base station instructs the user 2 to use the half-rate sub-channel 1. At this time, since the user 2 and the user 1 sends the SACCH over different frames and the SACCH frame is not subjected to the interference from the coupled user, the SACCH performance is enhanced.

2) By intra-cell switching, the base station instructs the user 2 to use the full-rate channel and to be multiplexed together with the user 1. By interchanging the locations of the SACCH frame and the idle frame of the user 2 on the VAMOS sub-channel 2, the SACCH frames of the user 1 and the user 2 are avoided from occurring simultaneously with each other and the SACCH frame is not subjected to the interference from the coupled user, thus the SACCH performance is enhanced.

3) By means of the method according to the first embodiment of the present invention, the two half-rate sub-channels on the VAMOS sub-channel 2 are alternately used. If the current 26-multiframe is an even frame (i.e. the $0^{th}$ frame and the $2^{nd}$ frame) in an SACCH cycle, the original channel allocation condition is remained, i.e. the user 2 occupies the half-rate sub-channel 0 on the VAMOS sub-channel 2. If the current 26-multiframe is an odd frame (i.e. the $1^{st}$ frame and the $3^{rd}$ frame) in an SACCH cycle, the user 2 occupies the half-rate sub-channel 1 on the VAMOS sub-channel 2. Thus, the SACCHs of the user 2 and the user 3 alternately occur simultaneously with the idle frame, thereby enhances their SACCH performance.

2. Assume that the user 1, the user 2 and the user 3 are all half-rate TCH users. The three users are multiplexed together with each other, where the user 1 occupies the VAMOS sub-channel 1 and the users 2 and 3 occupy the VAMOS sub-channel 2 (specifically, the user 2 occupies the half-rate sub-channel 0, and the user 3 occupies the half-rate sub-channel 1). Specific contents are as shown in FIG. 6.

In either the case that the user 1 occupies the half-rate sub-channel 0 or the case that the user 1 occupies the half-rate sub-channel 1, there may be simultaneous occurrence with the SACCH frame of the user 2 or the user 3 respectively. In order to obtain balanced SACCH performance, the two half-rate channels on the VAMOS sub-channel 2 are alternately used. If the current 26-multiframe is an even frame (i.e. the $0^{th}$ frame and the $2^{nd}$ frame) in an SACCH cycle, the original channel allocation condition is remained, i.e. the user 2 occupies the half-rate sub-channel 0 and the user 3 occupies the half-rate sub-channel 1, specifically as shown in FIG. 6($a$). If the current 26-multiframe is an odd frame (i.e. the $1^{st}$ frame and the $3^{rd}$ frame) in an SACCH cycle, the two sub-channels are interchanged with each other, i.e. the user 2 occupies the half-rate sub-channel 1 and the user 3 occupies the half-rate sub-channel 0, specifically as shown in FIG. 6($b$). Thus, the SACCHs of the user 2 and the user 3 alternately occur simultaneously with the idle frame of the user 1, thereby enhancing the SACCH performance of the system.

Figure 7:
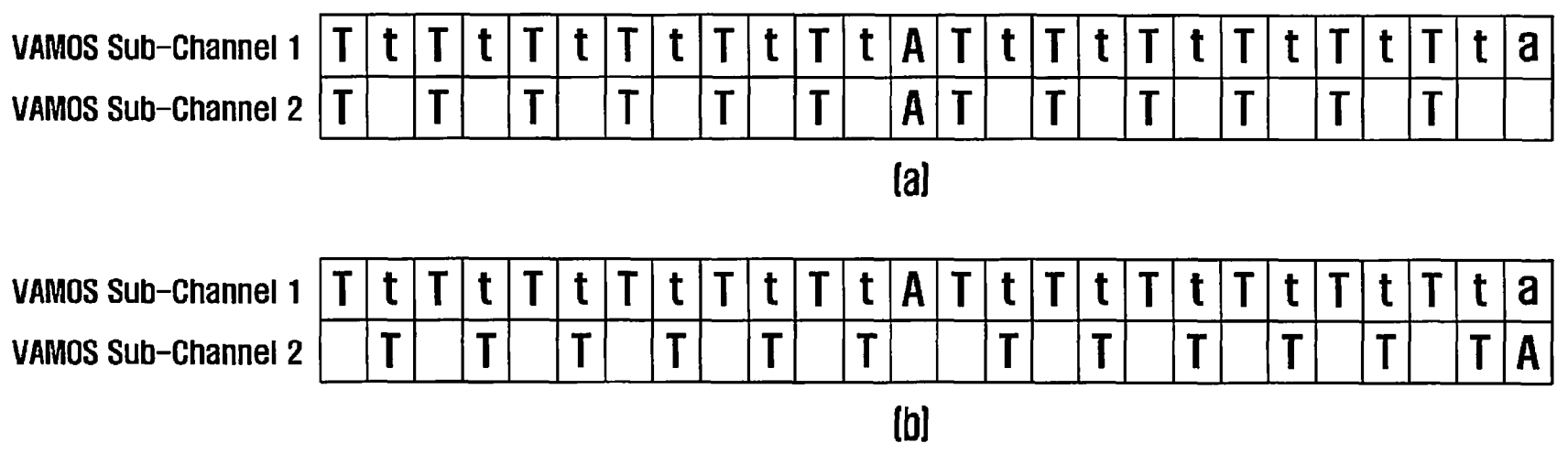

3. Assume that the user 1, the user 2 and the user 3 are all half-rate TCH users. The three users are multiplexed together with each other, where the users 2 and 3 occupy the VAMOS sub-channel 1 (specifically, the user 2 occupies the half-rate sub-channel 0, and the user 3 occupies the half-rate sub-channel 1), while the user 1 occupies the VAMOS sub-channel 2. In either the case that the user 1 occupies the half-rate sub-channel 0 or the case that the user 1 occupies the half-rate sub-channel 1, there may be simultaneous occurrence with the SACCH frame of the user 2 or the user 3 respectively. In order to facilitate description, assume that the user 1 occupies the half-rate sub-channel 0. Specific contents are as shown in FIG. 7.

In order to balance the SACCH frame performance of the system, the half-rate channels on the VAMOS sub-channel are interchanged with each other. If the current 26-multiframe is an even frame (i.e. the $0^{th}$ frame and the $2^{nd}$ frame) in an SACCH cycle, the original channel allocation condition is remained, i.e. the user 1 occupies the half-rate sub-channel 0, as shown in FIG. 7($a$). If the current 26-multiframe is an odd frame (i.e. the $1^{st}$ frame and the $3^{rd}$ frame) in an SACCH cycle, the user 1 occupies the half-rate sub-channel 1, as shown in FIG. 7($b$). Thus, the SACCHs of the user 2 and the user 3 alternately occur simultaneously with the idle frame of the user 1, thereby enhancing the SACCH performance of the system.

4. Assume that the user 1, the user 2, the user 3 and the user 4 are all half-rate TCH users. The four users are multiplexed together with each other to constitute a VAMOS user group, where the users 1 and 2 occupy the VAMOS sub-channel 1 (specifically, the user 1 occupies the half-rate sub-channel 0, and the user 2 occupies the half-rate sub-channel 1), while the users 3 and 4 occupy the VAMOS sub-channel 2 (specifically, the user 3 occupies the half-rate sub-channel 0, and the user 4 occupies the half-rate sub-channel 1). Therefore, the SACCH frames of the user 1 and the user 3 always occur simultaneously with each other. Similarly, the SACCH frames of the user 2 and the user 4 always occur simultaneously with each other. Specific contents are as shown in FIG. 8.

When any user in the user group has switched to an adjacent cell or terminates communication, the user group enters a "three-user" multiplexing situation, which at this time corresponds to the $2^{nd}$ or the $3^{rd}$ case in the first embodiment of the present invention. The method of interchanging the two half-rate sub-channels on the VAMOS sub-channel with each other may be used to obtain balanced SACCH performance. The specific process may be as discussed in the first embodiment of the present invention.

Assume that the user 2 leaves from the current user group first, and the remaining "three users" are multiplexed together with each other. There is still an event that since any user in the user group has switched to an adjacent cell or terminates communication, the user group enters a "two-user" multiplexing situation. If the user 1 leaves, the user 3 and the user 4, that use the half-rate sub-channel 0 and the half-rate sub-channel 1 respectively, remain. At this time, the VAMOS system does not exist. If it is the user 3 that leaves, the remaining user 3 and the user 4 use the half-rate sub-channel 0 and the half-rate sub-channel 1 respectively. At this time, the VAMOS system still does not exist. If it is the user 4 that leaves, the user 1 and the user 3 remain. If no change is made, since both the user 1 and the user 3 use the half-rate sub-channel 0, their SACCH frames still occur simultaneously with each other and have interference on each other.

In this event, there are solutions as follows.

1) By intra-cell switching, the base station instructs the user 1 and the user 3 to use different half-rate sub-channels. At this time, the VAMOS system does not exist, there is no mutual interference between them and meanwhile the SACCH and the TCH performance is enhanced.

2) By intra-cell switching, the base station instructs both the user 1 and the user 3 to use the full-rate channel and to be multiplexed together with each other. By interchanging the locations of the SACCH frame and the idle frame of the user 3 on the VAMOS sub-channel 2, the SACCH frames of the user 1 and the user 3 are avoided from occurring simultaneously with each, thus the SACCH performance is enhanced.

3) By means of the method according to the first embodiment of the present invention, the two half-rate sub-channels on the VAMOS sub-channel 2 are alternately used. If the current 26-multiframe is an even frame (i.e. the $0^{th}$ frame and the $2^{nd}$ frame) in an SACCH cycle, the original channel allocation condition is remained, i.e. the user 3 occupies the half-rate sub-channel 0 on the VAMOS sub-channel 2. If the current 26-multiframe is an odd frame (i.e. the $1^{st}$ frame and the $3^{rd}$ frame) in an SACCH cycle, the user 3 occupies the half-rate sub-channel 1 on the VAMOS sub-channel 2. Thus, the SACCHs of the user 2 and the user 3 alternately occur simultaneously with the idle frame, thereby enhances their SACCH performance.

Whether the method for enhancing SACCH performance according to the present invention is executed is selectable. In the VAMOS system, trail coupling may be implemented through the channel switching mode within the cell, and the free bit may be used as an indicator as to whether to execute the enhanced SACCH. Specifically, the base station may send Assignment Command signaling using the FACCH channel, and uses the free bit 7 in the channel type and TDMA offset domain of a Channel Description message as the indicator as to whether to exchange the half-rate sub-channels on the VAMOS sub-channel 2. If bit7=0, no exchange is carried out. If bit7=1, the exchange is carried out.

The free bit in the SACCH frame may also be used as the indicator as to whether to exchange the half-rate sub-channels on the VAMOS sub-channel 2. For example, two stolen flag bits in the SACCH frame are used as the indicator.

Assume that the two stolen flag bits are hl and hu. Then, there are four possible combinations for the two bits: 00, 01, 10, and 11. One, two or three of the four bit combinations may be used as the indicator for adopting the enhanced SACCH of the present invention, and the remaining combination is used as the indicator as to not adopting the present invention. Specific contents are as shown in Table 1 below.

Table 1 is a mapping relationship of the stolen bit of the SACCH frame.

TABLE 1

| hl, hu bit combination | Mapping relationship |
| --- | --- |
| 00 | Adopting the enhanced SACCH method |
| 01 | Reserved(or alternatively, serving as adopting the enhanced SACCH method) |
| 10 | Reserved(or alternatively, serving as adopting or not adopting the enhanced SACCH method) |
| 11 | Not adopting the enhanced SACCH method |

In summary, the mapping relationship of the two stolen flag bits of the SACCH frame may be used to define many patterns. In order to simplify description, detailed explanation, which however intended to fall within the scope of the present invention, is omitted herein.

The basic idea of the exemplary method lies in that: the two half-rate sub-channels are alternately used on the VAMOS sub-channel 2 so as to achieve the object of balancing the SACCH performance. Various specific exchange methods may also be defined. In order to simplify description, detailed explanation, which however intended to fall within the scope of the present invention, is omitted herein.

Second Embodiment

The method of retransmitting the SACCH in the free period of the DTX state may be used in the GERAN/VAMOS system.

The present invention mainly seeks to retransmit the SACCH when the user is in the DTX state and does not need to send any information so as to achieve the object of enhancing the SACCH performance.

During communication, the mobile user actually communicates in only 40% of the time, and does not transfer the voice message in most of the time. Hence, a Discontinuous Transmission(DTX) mechanism is introduced into the GSM.

The DTX serves for the following.

1. The transmitter is shut down in a communication interval, which can reduce the interference on the user that uses the same time-frequency resource in another cell of the system and improve the effectiveness of the system.

2. Since the DTX transmitter is used, the total transmission time is decreased, thus power consumption is decreased while extending a battery life of the mobile station.

In order to realize the DTX, Voice Activation Detection (VAD) should be used, where an indication can be given once a conversation is paused.

In the DTX state, the mobile station only delivers the inherent SACCH frame and the Silence Insertion Descriptor (SID). The SID frame is used to produce "comfortable noise". Such noise is made manually, and thus is produced regularly and periodically. The listener will not feel troublesome when it is decoded. It mainly serves to the following. In the case that no voice is to be delivered, on one hand, it is necessary for satisfying the measurement for the system, and on the other hand, it is intentionally produced to prevent the listener from mistakenly judging connection interruption (i.e. call dropping).

The DTX transmission mode can be implemented even at a very low rate. Under this mode, a 260-bit code, which is divided into 8 sub-blocks and sent in 8 TDMA frames (i.e. the SID frame), is delivered every 480 ms. However, under a normal state, a voice stream produces the 260-bit code every 20 ms. For the full-rate TCH, the 8 SID frames are sent fixedly over the first 8 TDMA frames of the $2^{nd}$ 26-multiframe of each SACCH cycle (104 continuous TDMA frames), i.e. the $52^{nd} \sim 59^{th}$ frames if 104 frames are taken as the cycle. For the half-rate sub-channel 0, the 8 SID frames occupy the first 4 frames of the $0^{th}$ 26-multiframe and the first 4 frames of the $2^{nd}$ 26-multiframe, i.e. the $0^{th}$, $2^{nd}$, $4^{th}$, $6^{th}$, $52^{nd}$, $54^{th}$, $56^{th}$, $58^{th}$ frames. For the half-rate sub-channel 1, if 104 frames are taken as the cycle, the 8 SID frames occupy the $14^{th}$, $16^{th}$, $18^{th}$, $20^{th}$, $66^{th}$, $68^{th}$, $70^{th}$, $72^{nd}$ frames respectively. Specific frame numbers are as shown in Table 2.

Table 2 is the transmission frame number of the SID frame in the GSM system.

TABLE 2

| Channel type | TDMA frame number(Modulus 104) |
| --- | --- |
| TCH/FS & TCH/EFS | 52, 53, 54, 55, 56, 57, 58, 59 |
| TCH/HS, sub-channel 0 | 0, 2, 4, 6, 52, 54, 56, 58 |
| TCH/HS, sub-channel 1 | 14, 16, 18, 20, 66, 68, 70, 72 |

Therefore, when the user is in the DTX state, within the 104 frames of an SACCH period, there are 92 frames that do not send any information in addition to sending 8 SID frames and 4 SACCH frames. Thus, one or more frames may be selected from the 92 free frames as a particular SACCH retransmission frame, so as to obtain a retransmission combination gain of the SACCH to enhance the SACCH performance.

1) For the Full-Rate TCH Service Channel

Figure 9:
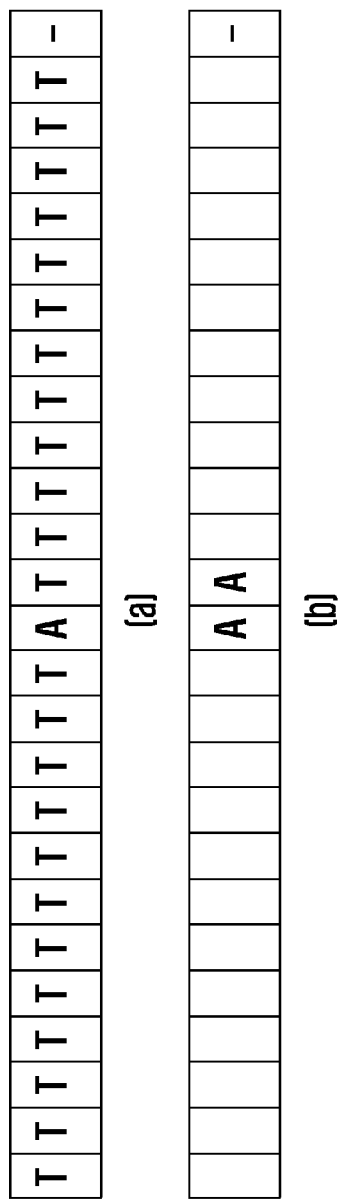
FIG. 9 is a schematic diagram illustrating the method for enhancing SACCH performance when the full-rate TCH is in a DTX state according to a second embodiment of the present invention.

FIG. 9(a) is a structural diagram illustrating the 26-multiframe of the full-rate TCH service. As shown in FIG. 9(a), assume that the user 1 is a full-rate voice user that participates in the coupling in the VAMOS system and occupies a VAMOS sub-channel. In both the uplink and the downlink, the user 1 is multiplexed over the same slot and carrier frequency with his/her coupled user.

When the user 1 is in the DTX state, after the SACCH frame is completely sent over the $12^{th}$ frame of each 26-multiframe, the current SACCH frame is retransmitted over the $13^{th}$ frame, specifically as shown in FIG. 9(b). Of course, one frame may be selected from the $14^{th}$ frame to the $25^{th}$ frame as the SACCH retransmission frame. In order to further enhance the SACCH performance, multiple frames may be selected from the 17 frames including the $8^{th}$ frame to the 11th frame and the $13^{th}$ frame to the $25^{th}$ frame as the SACCH retransmission frame. The 8 frames including the $0^{th}$ frame to the $7^{th}$ frame are not included, in order to exclude the SID frame.

2) For the Half-Rate TCH Service Channel

FIG. 10(a) is a structural diagram illustrating the 26-multiframe of the half-rate TCH. As shown in FIG. 10(a), the half-rate sub-channel 0 occupies a VAMOS sub-channel together with the half-rate sub-channel 1.

If being the half-rate TCH user, the user 1 occupies the half-rate sub-channel 0. Assume that the user 2 is another half-rate TCH user that shares the same slot with the user 1. Thus, the user 2 occupies the half-rate sub-channel 1. Thus, within each 26-multiframe, the user 1 occupies the 12 frames including the $0^{th}$, $2^{nd}$, $4^{th}$, $6^{th}$, $8^{th}$, $10^{th}$, $13^{th}$, $15^{th}$, $17^{th}$, $19^{th}$, $21^{st}$, $23^{rd}$ frames to send the voice block of the TCH/H channel and sends the SACCH over the $12^{th}$ frame. The user 2 occupies the 12 frames including the $1^{st}$, $3^{rd}$, $5^{th}$, $7^{th}$, $9^{th}$, $11^{th}$, $14^{th}$, $16^{th}$, $18^{th}$, $20^{th}$, $22^{nd}$, $24^{th}$ frames to send the voice block of the TCH/H channel and sends the SACCH over the $25^{th}$ frame.

When the user 1 is in the DTX state, the SACCH frame is sent fixedly over the $12^{th}$ frame of each 26-multiframe. Then, the current SACCH frame is retransmitted over the $13^{th}$ frame, specifically as shown in FIG. 10(b). Of course, one frame may be selected from the 5 frames including the $15^{th}$, $17^{th}$, $19^{th}$, $21^{st}$, $23^{rd}$ frames as the SACCH re-transmission frame. In order to further enhance the SACCH performance, certain frames may be selected from the 8 frames including the $8^{th}$, $10^{th}$, $13^{th}$, $15^{th}$, $17^{th}$, $19^{th}$, $21^{st}$, $23^{rd}$ frames as the SACCH retransmission frame. The 4 frames including the $0^{th}$, $2^{nd}$, $4^{th}$, $6^{th}$ frames are not included in order to exclude the SID frame.

When the user 2 is in the DTX state, in addition to sending the SACCH frame fixedly over the $25^{th}$ frame of each 26-multiframe, the SACCH frame may also be sent over the $24^{th}$ frame, specifically as shown in FIG. 10(c). Of course, the current SACCH frame may also be sent over the $24^{th}$ frame. In order to further enhance the SACCH performance, certain frames may be selected from the 8 frames including the $1^{st}$, $3^{rd}$, $5^{th}$, $7^{th}$, $9^{th}$, $11^{th}$, $22^{nd}$, $24^{th}$ frames as the SACCH retransmission frame. The 4 frames including the $14^{th}$, $16^{th}$, $18^{th}$, $20^{th}$ frames are not included in order to exclude the SID frame.

At the reception side, the received two or more SACCH frames are demodulated and combined, and the diversity gain may be obtained.

Whether the method for enhancing SACCH performance according to the present invention is executed is selectable. In the VAMOS system, trail coupling may be implemented through the channel switching mode within the cell, and the free bit may be used as an indicator as to whether to execute the enhanced SACCH. Specifically, the base station may send Assignment Command signaling using the FACCH channel, and uses the free bit 7 in the channel type and TDMA offset domain of a Channel Description message as the indicator as to whether to retransmit the SACCH in the free period of the DTX state. If bit7=0, no SACCH retransmission is carried out. If bit7=1, the retransmission is carried out.

The free bit in the SACCH frame may also be used as the indicator as to whether to retransmit the SACCH in the free period of the DTX state. For example, two stolen flag bits in the SACCH frame are used as the indicator.

Assume that the two stolen flag bits are hl and hu. Then, there are four possible combinations for the two bits: 00, 01, 10, and 11. One, two or three of the four bit combinations may be used as the indicator for adopting the enhanced SACCH of the present invention, and the remaining combination is used as the indicator for not adopting the present invention. Specific contents are as shown in Table 3 below.

Table 3 is a mapping relationship of the stolen bit of the SACCH frame.

TABLE 3

| hl, hu bit combination | Mapping relationship |
|---|---|
| 00 | Retransmitting the SACCH |
| 01 | Reserved(or alternatively, serving as the indicator for retransmitting the SACCH) |
| 10 | Reserved(or alternatively, serving as the indicator for retransmitting or not retransmitting the SACCH) |
| 11 | Not retransmitting the SACCH |

In summary, the mapping relationship of the two stolen flag bits of the SACCH frame may be used to define many patterns. In order to simplify description, detailed explanation, which however intended to fall within the scope of the present invention, is omitted herein.

The basic idea of the exemplary method lies in that: the current SACCH frame is retransmitted in the free period (i.e. no SID frame and SACCH frame is sent) of the DTX state of the user so as to achieve the object of enhancing the SACCH performance. Various methods for using one or more specific frames as the retransmission frame may also be defined. In order to simplify description, detailed explanation, which however intended to fall within the scope of the present invention, is omitted herein.

Third Embodiment

The method of changing the location of the SACCH frame on a VAMOS sub-channel so as to avoiding simultaneous occurrence with the SACCH frame on another VAMOS sub-channel may be used in the GERAN/VAMOS system.

As shown in FIG. 11, 3 TCHs are multiplexed together with each other, where two TCH/H are borne over the VAMOS sub-channel 1 and a TCH/FS is borne over the VAMOS sub-channel 2. As can be seen, without modification, the SACCH frame on the VAMOS sub-channel 2 is always subjected to the interference from the SACCH frame on the VAMOS sub-channel 1, which leads to a decrease in the SACCH performance.

The core idea of the present invention is as follows. The location of the SACCH frame on a VAMOS sub-channel is changed to avoid simultaneous occurrence with the SACCH frame on another VAMOS sub-channel. Thus, every SACCH frame occurs simultaneously with the TCH frame. When the TCH is in the DTX state and does not need to send any information, the SACCH frame may employ the GMSK modulation manner and is not subjected to the interference from the coupled user. Therefore, the object of enhancing the SACCH performance may be achieved.

The SACCH frame should be changed in accordance with principles as follows.

1) Backward compatibility is taken into consideration. Generally, the VAMOS sub-channel 1 is compatible with existing GSM terminals. Therefore, only the location of the SACCH frame on the VAMOS sub-channel 2 is changed.

2) The DTX transmission mode of the voice channel is taken into consideration. Under such mode, it is required to send 8 SID frames in each 480 ms SACCH cycle. Moreover, the SID sending locations for the full-rate TCH and the half-rate TCH are different from each other. Specific frame numbers are as shown in Table 2. Therefore, the changed location of the SACCH frame on the VAMOS sub-channel 2 should not conflict with the location for sending the SID frame under the DTX state.

3) The FACCH frame for sending signaling is taken into consideration. Since the

FACCH frame always employs the "stealing frame" manner to occur along with the TCH, there is a division regarding the FACCH/F (full-rate FACCH) and the FACCH/H(half-rate FACCH). The FACCH/F is channel coded as 456 bits, forms 8 sub-blocks after interleaving, and is mapped into 8 bursts, where the two bits of the stolen flag are both set to 1 so as to indicate that the burst is the FACCH (to indicate the TCH if being set to 0). Hence, the FACCH/F entirely occupies a full-rate TCH frame. The FACCH/H is channel coded as 456 bits, forms 8 sub-blocks after interleaving, and is mapped into 6 bursts, where the corresponding stolen flag is set. The specific interleaving process may be found in the GSM standards TS45.002 and TS45.003. The FACCH/H is mapped into 6 bursts, in which respective bursts have different interleaving gains. The two middle bursts have no inter-voice-block interleaving gain and have poor error tolerance while the four left/right bursts have the inter-voice-block interleaving gain. Therefore, the changed location of the SACCH frame on the VAMOS sub-channel 2 should not conflict with the locations of the two frames in the FACCH/H frame which have no inter-voice-block interleaving gain.

FIG. 12 is a structural schematic diagram illustrating the frame of a half-rate FACCH.

As shown in FIG. 12($a$) and ($b$), the structural schematic diagram illustrating the frame of the downlink FACCH/H on the half-rate sub-channel 0 and the half-rate sub-channel 1 is depicted. As can be seen, with in a 26-multiframe, the $0^{th}$, $1^{st}$, $2^{nd}$, $3^{rd}$, $8^{th}$, $9^{th}$, $10^{th}$, $11^{th}$, $17^{th}$, $18^{th}$, $19^{th}$, $20^{th}$ frames have no inter-voice-block interleaving gain. Therefore, such frames cannot be used to transmit the SACCH frame. In addition, since being prepared for transmitting the SID frame under the DTX state, the $0^{th}$, $2^{nd}$, $4^{th}$, $6^{th}$, $14^{th}$, $16^{th}$, $18^{th}$, $20^{th}$ frames cannot be used to transmit the SACCH frame either.

Hence, for the downlink half-rate sub-channel 0, the remaining frames that may be used to transmit the SACCH frame include: 13, 15, 21, and 23.

For the downlink half-rate sub-channel 1, the remaining frames that may be used to transmit the SACCH frame include: 5, 7, 22, and 24.

As shown in FIG. 12($c$) and ($d$), the structural schematic diagram illustrating the frame of the uplink FACCH/H on the half-rate sub-channel 0 and the half-rate sub-channel 1 is depicted.

Similarly, for the uplink half-rate sub-channel 0, the remaining frames that may be used to transmit the SACCH frame include: 8, 10, 17, and 19.

For the uplink half-rate sub-channel 1, the remaining frames that may be used to transmit the SACCH frame include: 1, 3, 9, and 11.

The locations of the shift SACCH should be designed as identical to each other in the uplink and the downlink. Considering that it is impossible to acquire complete synchronization for the uplink SACCH, the SACCH frames on different VAMOS sub-channels cannot totally overlap. Thus, during design, the downlink should be more considered, so that the shift of the frame is as less as possible.

In view of this, when the scenario that two TCH/HS are borne over the VAMOS sub-channel 1 and a TCH/FS is borne over the VAMOS sub-channel 2 arises, it is proposed in the present invention that the $13^{th}$ frame in the 26-multiframe on the VAMOS sub-channel may be used to transmit the SACCH frame, and that the 12th frame which should be used for transmitting the SACCH is used to transmit the TCH frame.

The basic idea of the exemplary method lies in the following. The location of the SACCH frame on a VAMOS sub-channel is changed to avoid simultaneous occurrence with the SACCH frame on another VAMOS sub-channel. Thus, the gain may be obtained when the TCH is in the DTX state. Also, when the location of the SACCH frame is changed, the FACCH/H should be taken into consideration, so as to reduce the influence on the FACCH/H channel as much as possible. Various methods regarding which frame is used to transmit the SACCH may be defined. In order to simplify description, detailed explanation, which however intended to fall within the scope of the present invention, is omitted herein.

The invention claimed is:

1. A method for enhancing Slow Associated Control Channel (SACCH) performance, the method comprising:
   if a user on a Voice services over Adaptive Multi-user channels on One Slot (VAMOS) sub-channel, that uses a half-rate Traffic Channel (TCH), is contained in a paired user group, receiving, from a base station, instruction information to alternately use a half-rate sub-channel 0 and a half-rate sub-channel 1 on a 26-multiframe in a SACCH period;
   if the 26-multiframe is numbered even in the SACCH period, transmitting by the user, a TCH frame and a SACCH frame over an originally allocated half-rate sub-channel among the half-rate sub-channel 0 and the half-rate sub-channel 1; and
   if the 26-multiframe is numbered odd in the SACCH period, swapping the originally allocated half-rate sub-channel to another half-rate sub-channel among the half-rate sub-channel 0 and the half-rate sub-channel 1, and transmitting, by the user, the TCH frame and the SACCH frame over the another half-rate sub-channel,
   wherein the half-rate sub-channel 0 and the half-rate sub-channel 1 are transmitted over the 26-multiframe, and
   wherein the SACCH period is composed of 4 continuous 26-multiframes.

2. The method according to claim 1, wherein the paired user group comprises at least one of following:
   1 full-rate TCH user and 2 half-rate TCH users multiplexed together with each other;
   3 half-rate TCH users multiplexed together with each other;
   2 half-rate TCH users multiplexed together with each other; and
   1 full-rate TCH user and 1 half-rate TCH user multiplexed together with each other.

3. The method according to claim 1, wherein the 4 continuous 26-multiframes are sequentially numbered as n, n+1, n+2, and n+3.

4. The method according to claim 1, wherein the VAMOS sub-channel is a VAMOS sub-channel 2.

5. The method according to claim 1, wherein the SACCH frame comprises at least one free bit used to indicate whether to enhance the SACCH performance.

6. The method according to claim 5, wherein further comprising:
   receiving, from the base station, Assignment Command signaling using a Fast Associated Control Channel (FACCH); and
   using the free bit in a channel type and a TDMA offset domain of a Channel Description message to indicate whether to enhance the SACCH performance.

7. The method according to claim 6, wherein swapping is employed when the free bit=1 and swapping is not employed when the free bit=0.

8. The method according to claim 5, wherein the SACCH frame comprises two stolen flag bits used as an indicator.

9. The method according to claim 8, wherein there are four combinations for the two stolen flag bits: 00, 01, 10, and 11, in which the first, second and third combinations, of the four combinations, are used to indicate to enhance the SACCH performance, and the fourth combination is used to indicate not to enhance the SACCH performance.

10. The method according to claim 1, wherein when there are only two users that use the half-rate TCH, an intra-cell channel handover is used to enhance the SACCH performance.

11. The method according to claim 10, wherein the instruction information comprises information to instruct the two users to use different half-rate TCH sub-channels.

12. The method according to claim 10, wherein the instruction information comprises information to instruct both of the two users to use a full-rate TCH, and to exchange locations of the SACCH frame and an idle frame of one user of the two users, so as to avoid their SACCH frames from occurring simultaneously.

13. The method according to claim 1, wherein when the user group is composed of a full-rate TCH user and a half-rate TCH user and the half-rate TCH user occupies a half-rate sub-channel 0, intra-cell channel handover is used to enhance the SACCH performance.

14. The method according to claim 13, wherein the instruction information comprises information to instruct the half-rate TCH user to occupy the half-rate sub-channel 1.

15. The method according to claim 13, wherein the instruction information comprises information to instruct both of the two users to use a full-rate TCH and to exchange locations of the SACCH frame and an idle frame of one user of the two users.

16. A method for enhancing Slow Associated Control Channel (SACCH) performance, the method comprising:
   retransmitting, when a Traffic Channel (TCH) is in a Discontinuous Transmission (DTX) state, a SACCH frame over a frame that does not need to transmit a Silence Insertion Descriptor (SID),
   wherein a downlink control channel provides an indicator used to indicate whether the SACCH frame is retransmitted,
   wherein at least one free bit is used to indicate whether the SACCH frame is retransmitted, and
   wherein the at least one free bit in a channel type and a TDMA offset domain of a Channel Description message is used for indicating whether the SACCH frame is transmitted in a free period of the DTX state.

17. The method according to claim 16, wherein the TCH is either a full-rate TCH or a half-rate TCH.

18. The method according to claim 16, wherein when a full-rate TCH is in the DTX state, the SACCH frame is retransmitted immediately after the SACCH frame is completely sent over a 12th frame of each 26-multiframe.

19. The method according to claim 16, further comprising:
   when a full-rate TCH is in the DTX state, one frame is selected from a 13th frame to a 25th frame of each 26-multiframe to retransmit the SACCH frame; or
   multiple frames are selected from seventeen frames including an 8th frame to an 11th frame and a 13th frame to the 25th frame of each 26-multiframe to retransmit the SACCH frame.

20. The method according to claim 16, wherein
when a user on a half-rate sub-channel 0 is in the DTX state, the SACCH frame is retransmitted over a 13th frame of each 26-multiframe; and
when a user on a half-rate sub-channel 1 is in the DTX state, the SACCH frame is retransmitted over a 24th frame of each 26-multiframe.

21. The method according to claim 16, wherein
when a user on a half-rate sub-channel 0 is in the DTX state, one frame is selected from six frames including $13^{th}$, 15th, 17th, 19th, 21st, and 23rd frames of each 26-multiframe; or
multiple frames are selected from eight frames including 8th, 10th, 13th, 25th, 17th, 19th, 21st, and 23rd frames of each 26-multiframe; and
when a user on a half-rate sub-channel 1 is in the DTX state, the SACCH frame is sent over a 22nd or a $24^{th}$ frame of each 26-multiframe; or
multiple frames are selected from eight frames including 1st, 3rd, 5th, 7th, 9th, 11th, 22nd, and 24th frames of each 26-multiframe.

22. The method according to claim 16, further comprising:
receiving, from a base station, Assignment Command signaling using a Fast Associated Control Channel (FACCH).

23. The method according to claim 16, wherein the free bit=1 indicates the SACCH frame is retransmitted in a free period of the DTX state and the free bit=0 indicates the SACCH frame is not retransmitted in the free period of the DTX state.

24. The method according to claim 23, wherein the SACCH frame comprises two stolen flag bits used as the indicator.

25. The method according to claim 24, wherein there are four combinations for the two stolen flag bits: 00, 01, 10, and 11, in which the first, second and third combination, of the four combinations, are used to indicate to enhance the SACCH performance, and the fourth combination is used to indicate not to enhance the SACCH performance.

26. A method for enhancing Slow Associated Control Channel (SACCH) performance, the method comprising:
changing a location of an SACCH frame on a Voice Service over Adaptive Multi-user channels on One Slot (VAMOS) sub-channel within each 26-multiframe, so as to avoid simultaneous occurrence with the SACCH frame on another VAMOS sub-channel; and
transmitting a half-rate Traffic Channel (TCH) frame and the SACCH frame on a given location,
wherein the changed location of the SACCH frame is determined by considering a frame having no interleaving with two Fast Associated Control CHannel/Half-rate (FACCH/H) channels, and
wherein, when two half-rate TCHs are borne over a VAMOS sub-channel 1 and a full-rate TCH is borne over a VAMOS sub-channel 2, the SACCH frame on the VAMOS sub-channel 1 is fixed and the SACCH frame on the VAMOS sub-channel 2 is shifted, so as to avoid the simultaneous occurrence with the SACCH frame on the VAMOS sub-channel 1.

27. The method according to claim 26, wherein considering the FACCH/H channel comprises excluding a frame used to transmit a Silence Insertion Descriptor (SID) frame.

28. The method according to claim 27, wherein the changed location of the SACCH frame in a 26-multiframe include 13th, 15th, 21st, and 23rd frames.

29. A method for enhancing Slow Associated Control Channel (SACCH) performance, comprising steps of:
if a user on a Voice services over Adaptive Multi-user channels on One Slot (VAMOS) sub-channel, that uses a half-rate Traffic Channel (TCH), is contained in a paired user group, transmitting to the user, instruction information to alternately use a half-rate sub-channel 0 and a half-rate sub-channel 1 on a 26-multiframe in a SACCH period;
if the 26-multiframe is numbered even in the SACCH period, receiving a TCH frame and an SACCH frame over an originally allocated half-rate sub-channel among the half-rate sub-channel 0 and the half-rate sub-channel 1;
if the 26-multiframe is numbered odd in the SACCH period, receiving the TCH frame and the SACCH frame over another half-rate sub-channel among the half-rate sub-channel 0 and the half-rate sub-channel 1, after the user swaps the originally allocated half-rate sub-channel to the another half-rate sub-channel; and
performing demodulation and deciphering,
wherein the half-rate sub-channel 0 and the half-rate sub-channel 1 are transmitted over the 26-multiframe, and
wherein the SACCH period is composed of 4 continuous 26-multiframes.

30. The method according to claim 28, wherein the paired user group comprises at least one of following:
1 full-rate TCH user and 2 half-rate TCH users multiplexed together with each other;
3 half-rate TCH users multiplexed together with each other;
2 half-rate TCH users multiplexed together with each other; and
1 full-rate TCH user and 1 half-rate TCH user multiplexed together with each other.

31. The method according to claim 29, wherein the 4 continuous 26-multiframes are sequentially numbered as n, n+1, n+2, and n+3.

32. The method according to claim 29, wherein the VAMOS sub-channel is a VAMOS sub-channel 2.

33. The method according to claim 29, wherein the SACCH frame comprises at least one free bit used to indicate whether to enhance the SACCH performance.

34. The method according to claim 33, further comprising:
receiving, from the base station, Assignment Command signaling using a Fast Associated Control Channel (FACCH); and
using the free bit in a channel type and a TDMA offset domain of a Channel Description message to indicate whether to enhance the SACCH performance.

35. The method according to claim 34, wherein swapping is employed when the free bit=1 and swapping is not employed when the free bit=0.

36. The method according to claim 33, wherein the SACCH frame comprises two stolen flag bits used as an indicator.

37. The method according to claim 36, wherein there are four combinations for the two stolen flag bits: 00, 01, 10, and 11, in which the first, second and third combinations, of the four combinations, are used to indicate to enhance the SACCH performance, and the fourth combination is used to indicate not to enhance the SACCH performance.

38. The method according to claim 29, wherein when there are only two users that use the half-rate TCH, an intra-cell channel handover is used to enhance the SACCH performance.

39. The method according to claim 38, wherein the instruction information comprises information to instruct the two users to use different half-rate TCH sub-channels.

40. The method according to claim 38, wherein the instruction information comprises information to instruct both of the two users to use a full-rate TCH, and to exchange locations of the SACCH frame and an idle frame of one user of the two users, so as to avoid their SACCH frames from occurring simultaneously.

41. The method according to claim 29, wherein when the user group is composed of a full-rate TCH user and a half-rate TCH user and the half-rate TCH user occupies a half-rate sub-channel 0, intra-cell channel handover is used to enhance the SACCH performance.

42. The method according to claim 41, wherein the instruction information comprises information to instruct the half-rate TCH user to occupy the half-rate sub-channel 1.

43. The method according to claim 41, wherein the instruction information comprises information to instruct both of the two users to use a full-rate TCH and to exchange locations of the SACCH frame and an idle frame of one user of the two users.

\* \* \* \* \*